US006822033B2

(12) United States Patent
Yu et al.

(10) Patent No.: US 6,822,033 B2
(45) Date of Patent: Nov. 23, 2004

(54) COMPOSITIONS AND METHODS FOR TREATING SET GYPSUM

(75) Inventors: Qiang Yu, Grayslake, IL (US); Qingxia Liu, Grayslake, IL (US); Jeffrey F. Grussing, Trevor, WI (US); Kevin W. Moyer, Park Ridge, IL (US); Richard Spencer, Villa Park, IL (US)

(73) Assignee: United States Gypsum Company, Chicago, IL (US)

( * ) Notice: Subject to any disclaimer, the term of this patent is extended or adjusted under 35 U.S.C. 154(b) by 82 days.

(21) Appl. No.: 09/992,302

(22) Filed: Nov. 19, 2001

(65) Prior Publication Data

US 2003/0100648 A1 May 29, 2003

(51) Int. Cl.⁷ .............................................. C08K 3/32
(52) U.S. Cl. ..................... 524/417; 414/416
(58) Field of Search ............................ 524/414, 416, 524/417, 423

(56) References Cited

U.S. PATENT DOCUMENTS

| | | |
|---|---|---|
| 2,216,207 A | 10/1940 | Menaul |
| 2,907,667 A | 10/1959 | Johnson |
| 3,382,083 A | 5/1968 | Marsden et al. |
| 3,615,189 A | 10/1971 | Hayakawa et al. |
| 3,623,895 A | 11/1971 | Nitzsche et al. |
| 3,660,068 A | 5/1972 | Wilson |
| 3,663,168 A | 5/1972 | Rubin et al. |
| 3,699,212 A | 10/1972 | Palm |
| 3,770,468 A | 11/1973 | Knauf et al. |
| 3,841,886 A | 10/1974 | Burr |
| 3,847,766 A | 11/1974 | Klaus |
| 3,935,343 A | 1/1976 | Nuttall |
| 3,951,675 A | 4/1976 | Krempff |
| 3,957,501 A | 5/1976 | Matsuda et al. |
| 3,964,256 A | 6/1976 | Plantif et al. |
| 3,977,888 A * | 8/1976 | Sano et al. ................. 427/344 |
| 3,980,487 A | 9/1976 | Akabayashi et al. |
| 4,010,134 A | 3/1977 | Braunisch et al. |
| 4,027,043 A | 5/1977 | Schroeder et al. |
| 4,028,125 A | 6/1977 | Martin |
| 4,036,658 A | 7/1977 | Pühringer et al. |
| 4,036,659 A | 7/1977 | Stude |
| 4,040,950 A | 8/1977 | Zipperian et al. |
| 4,043,950 A | 8/1977 | Wilmsen, deceased et al. |
| 4,049,778 A | 9/1977 | Hodgson |
| 4,054,461 A | 10/1977 | Martin |
| 4,054,462 A | 10/1977 | Stude |
| 4,081,598 A | 3/1978 | Morgan et al. |
| 4,088,738 A | 5/1978 | Hauge |
| 4,102,697 A | 7/1978 | Fukuba et al. |
| 4,107,376 A | 8/1978 | Ishikawa |
| 4,154,593 A | 5/1979 | Brown et al. |
| 4,174,230 A * | 11/1979 | Hashimoto et al. ......... 106/660 |
| 4,183,908 A | 1/1980 | Rolfe |
| 4,210,725 A | 7/1980 | Redfarn |
| 4,217,333 A | 8/1980 | Löblich |
| 4,236,911 A | 12/1980 | McCullough et al. |
| 4,296,015 A | 10/1981 | Aotani et al. |
| 4,322,301 A | 3/1982 | Blackmore |
| 4,324,775 A | 4/1982 | Tung |
| 4,341,560 A | 7/1982 | Saito et al. |
| 4,360,386 A | 11/1982 | Bounini |
| 4,399,110 A | 8/1983 | Kurandt |
| 4,411,702 A | 10/1983 | Makino et al. |
| 4,436,645 A | 3/1984 | Ceaser |
| 4,447,254 A | 5/1984 | Hughes et al. |
| 4,489,176 A | 12/1984 | Kluth et al. |
| 4,517,095 A | 5/1985 | Ceaser |
| 4,518,508 A | 5/1985 | Conner |
| 4,529,705 A | 7/1985 | Larsen |
| 4,563,285 A | 1/1986 | Nair et al. |
| 4,613,627 A | 9/1986 | Sherman et al. |
| 4,619,655 A | 10/1986 | Hanker et al. |
| 4,619,701 A | 10/1986 | Angrick et al. |
| 4,636,538 A | 1/1987 | Malcolm-Brown |
| 4,643,771 A | 2/1987 | Steinbach et al. |
| 4,684,567 A | 8/1987 | Okamoto et al. |
| 4,704,263 A | 11/1987 | Berry et al. |
| 4,729,853 A | 3/1988 | von Bonin |
| 4,746,365 A | 5/1988 | Babcock et al. |
| 4,748,051 A | 5/1988 | Songer et al. |
| 4,772,326 A | 9/1988 | Heinen et al. |
| 4,849,018 A | 7/1989 | Babcock et al. |
| 4,857,211 A | 8/1989 | Nineuil et al. |
| 4,861,397 A | 8/1989 | Hillstrom |
| 4,927,463 A | 5/1990 | Kloetzer et al. |
| 4,975,122 A | 12/1990 | Parkinson et al. |
| 4,992,481 A | 2/1991 | von Bonin et al. |
| 4,999,066 A | 3/1991 | Sherif |
| 5,062,235 A | 11/1991 | Cook, Jr. et al. |
| 5,068,103 A | 11/1991 | Kawazi et al. |
| 5,073,198 A | 12/1991 | Kurz |

(List continued on next page.)

FOREIGN PATENT DOCUMENTS

| | | |
|---|---|---|
| WO | WO 99/08978 A1 | 2/1999 |
| WO | WO 99/08979 A1 | 2/1999 |
| WO | WO 00/06518 A | 2/2000 |

OTHER PUBLICATIONS

Van Wazer, *Phosphorus and Its Compounds*, vol. 1 (Interscience Publishers, Inc. New York (1958) pp. 419–427 and pp. 679–695.

*Primary Examiner*—Callie Shosho
(74) *Attorney, Agent, or Firm*—Michael M. Geoffrey; David F. Janci; Leydig, Voit & Mayer, Ltd.

(57) ABSTRACT

A composition and method for treating a set gypsum-containing material are disclosed. The composition is formed from at least water at least one trimetaphosphate salt, at least one monobasic phosphate salt, and at least one acyclic polyphosphate salt having at least three phosphate units. The method comprises applying to a set gypsum material at least two of the following inorganic phosphates: at least one monobasic phosphate salt, at least one trimetaphosphate salt, and at least one acyclic polyphosphate salt having at least three phosphate units. The method can be for inhibiting re-calcination of a set gypsum containing material, and/or for enhancing the strength, surface hardness, paintability, abrasion resistance, and/or water erosion resistance of a set gypsum-containing material. Also disclosed is a method of making a set gypsum-containing material.

15 Claims, No Drawings

U.S. PATENT DOCUMENTS

| | | |
|---|---|---|
| 5,082,501 A | 1/1992 | Kurz |
| 5,091,441 A | 2/1992 | Omura |
| 5,100,948 A | 3/1992 | Aydin et al. |
| 5,118,336 A | 6/1992 | Biez |
| 5,135,805 A | 8/1992 | Sellers et al. |
| 5,141,561 A | 8/1992 | Ledard et al. |
| 5,149,368 A | 9/1992 | Liu et al. |
| 5,160,639 A | 11/1992 | McCollum |
| 5,258,069 A | 11/1993 | Knechtel et al. |
| 5,281,265 A | 1/1994 | Liu |
| 5,284,700 A | 2/1994 | Strauss et al. |
| 5,292,781 A | 3/1994 | Floyd |
| 5,296,026 A | 3/1994 | Monroe et al. |
| 5,304,239 A | 4/1994 | Schwabe et al. |
| 5,336,316 A | 8/1994 | Dawson et al. |
| 5,340,392 A | 8/1994 | Westbrook et al. |
| 5,366,507 A | 11/1994 | Sottosanti |
| 5,401,310 A | 3/1995 | Ture |
| 5,411,941 A | 5/1995 | Grinna et al. |
| 5,462,722 A | 10/1995 | Liu et al. |
| 5,466,273 A | 11/1995 | Connell |
| 5,468,282 A | 11/1995 | Yugami et al. |
| 5,496,914 A | 3/1996 | Wood et al. |
| 5,500,668 A | 3/1996 | Malhotra et al. |
| 5,508,263 A | 4/1996 | Grinna et al. |
| 5,520,926 A | 5/1996 | Ferguson |
| 5,527,982 A | 6/1996 | Pal et al. |
| 5,545,297 A | 8/1996 | Andersen et al. |
| 5,549,859 A | 8/1996 | Andersen et al. |
| 5,614,307 A | 3/1997 | Andersen et al. |
| 5,618,627 A | 4/1997 | Merrifield et al. |
| 5,624,481 A | 4/1997 | Gerhardinger et al. |
| 5,626,668 A | 5/1997 | Gerhardinger et al. |
| 5,626,954 A | 5/1997 | Andersen et al. |
| 5,631,097 A | 5/1997 | Andersen et al. |
| 5,637,362 A | 6/1997 | Chase et al. |
| 5,648,097 A | 7/1997 | Nuwayser |
| 5,654,048 A | 8/1997 | Andersen et al. |
| 5,658,624 A | 8/1997 | Anderson et al. |
| 5,695,811 A | 12/1997 | Andersen et al. |
| 5,705,237 A | 1/1998 | Andersen et al. |
| 5,705,242 A | 1/1998 | Andersen et al. |
| 5,746,822 A | 5/1998 | Epspinoza et al. |
| 5,749,936 A | 5/1998 | Humphries et al. |
| 5,753,163 A | 5/1998 | Sekhar et al. |
| 5,759,037 A | 6/1998 | Fischer |
| 5,797,988 A | 8/1998 | Linde et al. |
| 5,798,151 A | 8/1998 | Andersen et al. |
| 5,807,567 A | 9/1998 | Randolph et al. |
| 5,830,319 A | 11/1998 | Landin |
| 5,830,548 A | 11/1998 | Andersen et al. |
| 5,837,752 A | 11/1998 | Shastri et al. |
| 5,882,395 A | 3/1999 | Linde et al. |
| 6,182,407 B1 * | 2/2001 | Turpin et al. ............... 52/232 |
| 6,409,824 B1 * | 6/2002 | Veeramauneni et al. .... 106/772 |

\* cited by examiner

COMPOSITIONS AND METHODS FOR TREATING SET GYPSUM

TECHNICAL FIELD OF THE INVENTION

The present invention relates generally to compositions and methods for treating set gypsum products and to methods for making set gypsum-containing materials. More particularly, the invention relates to compositions and methods for treating and making set gypsum such that the set gypsum is imparted with enhanced characteristics, including surface hardness, strength, thermal stability, paintability, abrasion resistance, and/or water erosion resistance.

BACKGROUND OF THE INVENTION

Set gypsum (calcium sulfate dihydrate) is a well-known material that is used to make many types of products and that is included commonly in many types of products. Generally, gypsum-containing products are prepared by forming a mixture of calcined gypsum (calcium sulfate hemihydrate and/or calcium sulfate anhydrite) and water, and optionally other components, as desired. The mixture typically is cast into a pre-determined shape or onto the surface of a substrate. The calcined gypsum reacts with the water to form a matrix of crystalline hydrated gypsum (calcium sulfate dihydrate). It is the desired hydration of the calcined gypsum that enables the formation of an interlocking matrix of set gypsum, thereby imparting strength to the gypsum structure in the gypsum-containing product. Mild heating can be used to drive off unreacted water to yield a dry product.

There is a continuing need to improve performance of certain characteristics, particularly surface characteristics, of the set gypsum for many products that include set gypsum as a major component. In this respect, the set gypsum surface of many conventional set gypsum-containing products is susceptible to water erosion, and to abrasion and scratching during use because of the generally poor surface characteristics of the set gypsum. It is desirable, therefore, to improve the strength and surface hardness of the set gypsum component of such products.

By way of example, set gypsum is a major component of molds made of plaster that are used in casting pottery figurines and the like using pressure casting or slip casting techniques known in the art. In such castings, wet material, for example, a mixture of water and clay is added to the mold. The plaster mold is designed to be porous so that it can absorb water that is drawn out from the clay being molded to form greenware. During the casting process, the mold becomes saturated with water and the water must be removed periodically from the mold, for example, via compressive air purging or other drying techniques, to form the desired molded product (greenware). Because the set gypsum of the plaster mold is somewhat soluble in water, the continual transfer of water into and out of the mold causes the set gypsum of the plaster mold to erode.

Many conventional plaster molds also are thermally and dimensionally unstable to some degree. Plaster molds often are subjected to sustained elevated temperatures, for example, to temperatures of 140° F. or higher, for a time period of, for example, 30 minutes or longer. In particular, surface re-calcination of the set gypsum can also occur and has been observed. Surface re-calcination undesirably results in a loss of some strength because a portion of the set gypsum matrix is weakened. For example, surface re-calcination can cause the set gypsum component to contract and then cause cracks to form in the plaster molds. It also would be desirable to extend the use-life of plaster molds by enhancing the surface hardness, strength, and abrasion resistance of the molds.

In a similar way, it also would be desirable to improve the surface characteristics of many other products that include set gypsum as a major component. For example, conventional exterior statuary also can experience water erosion caused by exposure to moisture from any of the known sources, including condensation in the form of rain, snow and ice. In addition, exterior and interior statuary are prone to abrasions and, accordingly, improving the abrasion resistance of the set gypsum matrix of statuary is likewise desirable. Paintability, or paint adhesion to the set gypsum surface of set gypsum-containing products such as statuary, is also desirable, for example, in order to minimize the amount of paint needed to adequately cover the surface of the product, to minimize paint chipping, and the like. There further is a need to provide set gypsum-containing statuary having improved thermal and dimensional stability. Conventional statuary, when made, must be dried at relatively low temperatures, inasmuch as elevated temperatures (e.g., 100° C. or higher) can lead to cracking and thermal contraction of the set gypsum. Statuary made of set-gypsum that is thermally and dimensionally stable could be dried at elevated temperatures, thereby enhancing the overall efficiency of the process.

Set gypsum also is included in veneer plaster, such as, for example, DIAMOND® brand interior finish plaster, commercially available from United States Gypsum Company, used to finish interior wallboards. Veneer plasters are formulated to have a relatively soft surface so as to facilitate the application thereof to a substrate. As a result, the surface hardness and strength of the veneer plaster is compromised such that the plaster is more susceptible to scratching or abrasions. This is particularly troublesome when lime is added as an ingredient to the product, as is typical to enhance the workability of the veneer compound. Accordingly, the product's ability to resist abrasions is compromised.

It also is known to combine set gypsum with cellulosic fibers, for example, gypsum-wood fiber board such as FIBEROCK® brand composite panels, commercially available from United States Gypsum Company. During the preparation of this type of panel, calcined gypsum (e.g., alpha calcium sulfate hemihydrate) and water penetrate the cellulosic fiber pores. Upon rehydration, the set gypsum forms in situ within and about the pores of the cellulosic fibers, thereby adding strength to the product. The set gypsum-fiber composite can suffer from water erosion, abrasions, and blisters. In addition, the water required to form the set gypsum causes blistering of the fibers. As a result, such products do not bind well with paint and, therefore, exhibit poor paintability such that relatively large quantities of paint are required.

Set gypsum also is known to be used as a major component in floor underlayments. Moreover, there is an increasing demand for poured floor underlayments comprising set gypsum that include an embedded hot water heating system. However, the heat can cause some re-calcination of the set gypsum, thereby leading to thermal contraction and the formation of unsightly cracks in the floors. Set gypsum-containing floor underlayments also are vulnerable to water erosion and abrasion.

Accordingly, it will be appreciated from the foregoing that there is a need in the art for set gypsum products that exhibit enhanced abrasion resistance, water erosion resistance, surface hardness, paintability, strength, thermal stability, or the like. There is also a need for a composition and method for treating set gypsum to satisfy any one or more of these needs.

BRIEF SUMMARY OF THE INVENTION

The present invention provides a set gypsum-containing material, a composition for coating a set gypsum-containing material, a method for treating a set gypsum-containing material, and a method for making a set gypsum-containing material.

It has been found that treating set gypsum with various combinations of monobasic phosphate salts, trimetaphosphate salts and acyclic polyphosphate salts having at least three phosphate units impart to the set gypsum enhanced surface characteristics, strength, and thermal and dimensional stability. Treating set gypsum, as will be appreciated by those skilled in the art, can include post-set treatment of set gypsum. It also is possible to include trimetaphosphate salt during the formation of the set gypsum product followed by post-set treatment with one or both of the remaining types of salts, and still achieve the surprisingly enhanced surface strength, and stability characteristics of the set gypsum product. As will be appreciated, many different treatment combinations can be used while still achieving the benefits of the invention as described herein.

Thus, in one aspect, the present invention provides an aqueous composition for coating a set gypsum-containing material, which is formed from at least one member from each of the classes of phosphate salts described above and which preferably imparts to the set gypsum-containing material an improvement in one or more of its strength, surface hardness, water erosion resistance, or abrasion resistance. The aqueous composition is formed from at least one monobasic phosphate salt; at least one trimetaphosphate salt; and at least one acyclic polyphosphate salt having at least three phosphate units. In some embodiments, a water dispersible polymer or a water soluble polymer, such as a polymer latex or the like, is also used to form the composition.

The present invention also provides a method of treating a set gypsum-containing material. The method comprises applying to the set gypsum-containing material at least one member from each of at least two of the following types of inorganic phosphate salts: monobasic phosphate salts, trimetaphosphate salts, and acyclic polyphosphate salts having at least three phosphate units. In some embodiments, the set gypsum-containing material is treated further with a water dispersible polymer or a water soluble polymer, such as a polymer latex or the like. Preferably, the inorganic phosphate salts are applied in amounts sufficient to impart the set gypsum-containing material with an improvement, as compared with the untreated set gypsum-containing material, in one or more of the following characteristics: strength (e.g., flexural), surface hardness, abrasion resistance, water erosion resistance, or the like.

In another aspect, the present invention provides a method of making a set gypsum-containing material. The method comprises forming a set gypsum matrix from water, calcined gypsum, and at least one trimetaphosphate salt. The set gypsum matrix is then treated with at least one of the following types of inorganic phosphate salts: monobasic phosphate salts and acyclic polyphosphate salts having at least three phosphate units. In this aspect of the invention, post-set treatment is used to treat the set gypsum with the salts described above.

Advantageously, the compositions and methods of the invention enhance set gypsum-containing products by improving one or more desirable characteristics of the products such as, for example, surface hardness, abrasion resistance, water erosion resistance, paintability, thermal stability, such as cracking resistance, dimensional stability such as shrinkage resistance, strength and the like. The compositions and methods of the invention can be used with any of a number of set gypsum-containing products, including, by way of example and not in limitation, plaster molds for pottery casting, interior/exterior statuary, veneer plasters, gypsum-cellulosic fiber products, floor underlayments, and the like.

These and other advantages of the present invention, as well as additional inventive features, will be apparent from the description of the invention provided herein.

The invention may best be understood with reference to the following detailed description of the preferred embodiments.

DETAILED DESCRIPTION OF THE PREFERRED EMBODIMENTS

The present invention provides a composition and method for treating a set gypsum-containing material. The set gypsum-containing material can be any of a wide variety of products for which the beneficial effects of the invention are useful. By way of example, the set gypsum-containing material can be in the form of plaster molds for pottery casting, interior/exterior statuary, gypsum-cellulosic fiber products, such as gypsum-wood fiber wallboard, veneer plasters, floor underlayments, and the like. The composition and method of the invention desirably enhance one or more of the surface hardness, paintability, thermal stability, dimensional stability, water erosion resistance, abrasion resistance and the like as well as the strength (wet and/or dry) of the set gypsum-containing material.

The set gypsum-containing material in accordance with the present invention comprises an interlocking set gypsum matrix prepared from a mixture comprising water and calcined gypsum, and which has been treated with a combination of two or more of the following three types of salts, monobasic phosphate salts, trimetaphosphate salts, and acyclic polyphosphate salts. The combination of salts for this treatment preferably is included in an aqueous solution.

The calcined gypsum can be fibrous or non-fibrous. In some embodiments, a major portion (e.g., at least about 50 wt. %) of the calcined gypsum is non-fibrous, while in other embodiments, a major portion (e.g., at least about 50 wt. %) of the calcined gypsum is fibrous. In addition, the calcined gypsum can be in the form of alpha calcium sulfate hemihydrate, beta calcium sulfate hemihydrate, water-soluble calcium sulfate anhydrite or combinations thereof.

In some embodiments, the set gypsum-containing material comprises additional components, besides the set gypsum. By way of example, the set gypsum-containing material can include one or more fillers, for example, inert fillers such as silica sand, hydrated lime, or the like, in amounts normally used in such set gypsum-containing materials, as will be appreciated readily by the ordinarily skilled artisan.

In accordance with the present invention, the set gypsum-containing material is treated with at least two of the following inorganic phosphates: (a) at least one monobasic phosphate salt; (b) at least one trimetaphosphate salt; and/or (c) at least one acyclic polyphosphate salt having at least three phosphate units. In preferred embodiments, the set gypsum-containing material is treated with at least one of each of the monobasic phosphate salt, trimetaphosphate salt, and acyclic polyphosphate salt having at least three phosphate units. It should be understood by those skilled in the art that while the description herein refers to the use of a "phosphate salt," the phosphate salt may be the salt itself or it may be a phosphate ion. For example, while a phosphate salt is added to water to form the composition, the formed aqueous composition, it is believed, includes phosphate ion, and the phosphate ion, it is believed, is used in the treatment of the set gypsum containing material. Importantly, it has been found that the treatment of a set gypsum material of a composition made using the salts described herein provide the benefits to the set gypsum product and applicants do not wish to be bound to any particular theory or mechanism by which the beneficial results may be achieved.

The monobasic phosphate salt and the acyclic polyphosphate salt desirably are applied in a post-set treatment, that is, after a major portion and preferably after all of the set gypsum is formed. In this respect, the monobasic phosphate salt and acyclic polyphosphate salt having at least three phosphate units can be added (e.g., via an aqueous solution) after the set gypsum is formed, and prior to or after drying off excess water. Thus, the post-set treatment can be used on wet (aqueous) set gypsum as well as on dry set gypsum. Preferably, the trimetaphosphate salt is also provided in a post-set treatment, and preferably as a component of the post-set treatment composition along with the monobasic phosphate salt and acrylic polyphosphate salt to the extent such salts are included in the composition.

In some embodiments, it is desirable, and even preferable, to add the trimetaphosphate salt in a pre-set treatment, for example, by including the trimetaphosphate salt in the mixture comprising water and calcined gypsum used to make the set gypsum, and then, in a post-set treatment to add the remaining phosphate salts to the set gypsum, for example, by spraying, soaking, or brushing with an aqueous phosphate solution. Surprisingly, this combination of pre-set treatment and post-set treatment provides for the beneficial effect on the set gypsum-containing material. The monobasic phosphate salt and the acyclic polyphosphate salt having at least three phosphate units are not included in a pre-set treatment, because they are retarders of the rate of set gypsum formation and impair or even prevent the formation of the interlocking matrix of set gypsum, thereby leading to products with undesirable surface characteristics and strength.

In the post-set treatment, the monobasic phosphate salt, trimetaphosphate salt, and/or acyclic polyphosphate salt having at least three phosphate units, can be applied in any suitable manner. For example, the phosphates can be applied via spraying, dipping, spin-coating, brushing, rolling, or combinations thereof. Other suitable ways of applying the inorganic phosphates will be apparent to those of ordinary skill in the art. For example, in the context of pottery plaster molds, the phosphates can be applied during the process of purging water from the mold. In this respect, the phosphates can be included, if desired, in the air purge process. Notably, in the context of the present invention, each phosphate can be applied individually, with or without a carrier such as water, or the phosphates can be applied by an aqueous composition comprising the desired phosphates. Preferably, the phosphates are applied by an aqueous composition formed from at least two of the following inorganic phosphates: (a) at least one monobasic phosphate salt; (b) at least one trimetaphosphate salt; and (c) at least one acyclic polyphosphate salt having at least three phosphate units. It has been found that it is the combination of two or more of the inorganic phosphates that provides the improved properties to set gypsum products as compared to treatment of set gypsum products using only one of these phosphate salts. Thus, the method of application or order of addition is not critical to the post-set treatment of a set gypsum-containing material.

While not wishing to be bound to any particular theory, it is believed that the inorganic phosphate salts each contribute to various strength and surface characteristics of set gypsum in a way that, when combined, provides a superior set gypsum product. Thus, it is believed that the monobasic phosphate salt enhances the dry compressive strength, wet or dry surface hardness, and abrasion resistance of set gypsum. In addition, the monobasic phosphate salt exhibits synergistic effects in combination with the trimetaphosphate salt and/or the acyclic polyphosphate salt having at least three phosphate units, with respect to other characteristics of the set gypsum-containing material.

Generally, in the monobasic phosphate salt, the anion is derived from an acid (e.g., phosphoric acid), in which one hydrogen atom is displaced per molecule. In the salt, the displaced hydrogen is replaced with a cation. By way of example, and not by way of limitation, the monobasic phosphate salt can be selected from monoammonium phosphate, monosodium phosphate, monolithium phosphate, monopotassium phosphate, or combinations thereof. In a preferred embodiment, the monobasic phosphate salt is monoammonium phosphate.

The monobasic phosphate salt is included in an amount sufficient to enhance desired characteristics of the set gypsum-containing material, such as, for example, the dry compressive strength, the wet or dry surface hardness and the like. It will be appreciated that the monobasic phosphate salt preferably is included in an aqueous composition which then is applied to the set gypsum product in a post-set treatment application. Preferably, the amount of monobasic salt used to treat the set gypsum is from about 0.05% to about 2% by weight of the set gypsum in the set gypsum-containing material. Accordingly, when included in the aqueous composition, the composition preferably includes a monobasic phosphate salt (or ion) in an amount of from about 0.1% to about 10% by weight, preferably of from about 1% to about 4% by weight, and more preferably of from about 2% to about 3%. The amounts can be varied depending on desired physical properties and cost effectiveness to be achieved.

The trimetaphosphate salt is believed to be beneficial for enhancing the strength, thermal stability and dimensional stability of the set gypsum-containing material. In addition, the trimetaphosphate salt acts synergistically with the monobasic phosphate salt and/or the acyclic polyphosphate salt having at least three phosphate units in order to enhance desired characteristics of the set gypsum-containing material.

The trimetaphosphate salt has a cyclic structure that contains three phosphorous atoms in a six-membered ring. Any suitable trimetaphosphate salt (preferably water soluble) can be used in accordance with the present invention, including double salts, that is, trimetaphosphate salts having two different cations. The trimetaphosphate salt can be selected, for example, from sodium trimetaphosphate, potassium trimetaphosphate, ammonium trimetaphosphate, lithium trimetaphosphate, or combinations thereof. Sodium trimetaphosphate is preferred.

The trimetaphosphate salt can be provided in a pre-set or post-set treatment in an amount effective to enhance desired characteristics of the set gypsum-containing material, such as, for example, the strength, thermal stability and dimensional stability and the like. It will be appreciated that the trimetaphosphate salt can be included in an aqueous composition which then is applied to the set gypsum product in a post-set treatment application, or which is applied to the calcined gypsum in a pre-set treatment. The amount of trimetaphosphate salt that is added is sufficient to impart the desired characteristics to the set gypsum. Preferably, the amount of trimetaphosphate salt used to treat the set gypsum, by either the post-set or pre-set techniques, is from about 0.05% to about 2% by weight of the set gypsum in the set gypsum-containing material. Accordingly, when included in an aqueous composition, the composition preferably includes a trimetaphosphate salt (or ion) in an amount of from about 0.5% to about 10% by weight, preferably of from about 1% to about 4% by weight, and more preferably of from about 1% to about 2%. The amounts can be varied depending on desired improvement of the set gypsum containing products and cost effectiveness.

The acyclic polyphosphate salt having at least three phosphate units is believed to be beneficial for enhancing the wet or dry surface hardness and water erosion resistance of the set gypsum-containing material, and it acts synergistically with the monobasic phosphate salt and/or the trimetaphosphate salt to further enhance desired characteristics of the set gypsum-containing material. The acyclic polyphosphate salt can have various degrees of polymerization. Longer chains are preferable, provided that the acyclic polyphosphate salt remains soluble in water. The acyclic polyphosphate salt includes at least three phosphate units but the upper limit on the number of phosphate units can vary, so long as the acyclic polyphosphate salt remains water soluble.

Any suitable acyclic polyphosphate salt having at least three phosphate units can be utilized in accordance with the present invention. Preferably, the acyclic polyphosphate salt has from about 6 to about 27 repeating phosphate units. By way of example, suitable acyclic polyphosphate salts in accordance with the present invention include, but are not limited to, sodium hexametaphosphate having from about 6 to about 27 repeating phosphate units, potassium hexametaphosphate having from about 6 to about 27 repeating phosphate units, ammonium hexametaphosphate having from about 6 to about 27 repeating phosphate units, and combinations thereof. A preferred acyclic polyphosphate salt pursuant to the present invention is commercially available as CALGON® from Astaris, Inc., St. Louis, Mo., which is a sodium hexametaphosphate having from about 6–27 repeating phosphate units.

The acyclic polyphosphate salt is included in an amount sufficient to enhance desired characteristics of the set gypsum-containing material, such as, for example, the wet or dry surface hardness and water erosion resistance, and the like. It will be appreciated that the acyclic polyphosphate salt preferably is included in an aqueous composition which then is applied to the set gypsum product in a post-set treatment application. The amount of acyclic polyphosphate salt that is added is sufficient to impart the desired characteristics to the set gypsum-containing material. Preferably, the amount of acyclic polyphosphate salt used to treat the set gypsum is from about 0.05% to about 2% by weight of the set gypsum in the set gypsum-containing material. Accordingly, when included in the aqueous composition, the composition preferably includes an acyclic polyphosphate salt (or ion) in an amount of from about 1% to about 10% by weight, preferably of from about 2% to about 8% by weight, and more preferably of from about 2% to about 4%. The amounts can be varied depending on desired improvement of the set gypsum products and cost effectiveness.

It will be appreciated that various combinations of the inorganic phosphate salts, namely the monobasic phosphate salt, the trimetaphosphate salt, and the acyclic polyphosphate salt can be utilized in accordance with the present invention. In this respect, various combinations of the inorganic phosphates produce unexpected benefits in terms of desired characteristics of the set gypsum-containing material. For example, a combination of a monobasic phosphate salt and an acyclic polyphosphate salt having at least three repeating phosphate units, in combination, exhibit unexpected benefits with respect to dry compressive strength, wet or dry surface hardness, and abrasion resistance. In addition, combinations of the trimetaphosphate salt and the acyclic polyphosphate salt having at least three phosphate units synergistically enhance abrasion resistance. Preferably, at least one of each of the monobasic phosphate salt, trimetaphosphate salt, and acyclic polyphosphate salt having at least three phosphate units, are utilized together.

In accordance with the present invention, the inorganic phosphates can be applied individually to the set gypsum-containing material, or, in some embodiments, a composition is provided that is formed from at least two of the following inorganic phosphates: (a) at least one monobasic phosphate salt, (b) at least one trimetaphosphate salt, and/or (c) at least one acyclic polyphosphate salt having at least three repeating phosphate units.

In some embodiments of the aqueous composition, at least one of each of the three classes of the inorganic phosphates is present, each in any suitable amount. By way of illustration only, the composition can include, for example, from about 2 wt. % to about 8 wt. % of the acyclic polyphosphate salt having three phosphate units, and from about 1 wt. % to about 4 wt. % of each of the trimetaphosphate salt and the monobasic phosphate salt.

In some embodiments, the set gypsum-containing material is post-set treated with a polymer solution comprising water dispersible or water soluble polymers, such as, for example, polymer latex. Use of such a polymer solution assists in the enhancement of, for example, water erosion resistance of the set gypsum-containing material. In addition, the polymer solution acts synergistically with the inorganic phosphates of the present invention with respect to other desired characteristics of the set gypsum-containing material. For example, use of the polymer solution requires less of the inorganic phosphates to be used. This is advantageous because polymer materials (e.g., polymer latex) are generally less expensive than the various inorganic phosphates which have been found to be useful in the practice of the present invention.

Although not wishing to be bound by any particular theory, it is believed that the inorganic phosphates enhance the cross-linking of the water dispersible or water soluble polymers and the bonding of gypsum crystals on the surface of gypsum based products. For example, it is believed that the solubility of gypsum in an aqueous phosphate solution, and the migration of phosphates and water dispersible or water soluble polymer to the surface of the gypsum-containing material during drying, catalyzes the formation of inorganic phosphate-organic polymer composites on the surface of the set gypsum-containing material. By utilizing the water dispersible or water soluble polymer, in combination with the inorganic phosphates of the present invention, the water erosion resistance, abrasion resistance, and flexural strength of the set gypsum-containing material is improved.

Any suitable water dispersible or water soluble polymer can be used in accordance with the present invention. For example, the water dispersible or water soluble polymer can be selected from polyvinyl alcohol, polyvinyl acetate, guar gum, sulphonated polystyrene latex, acrylics, rubber latex, or the like, or blends or copolymers thereof. The polymer can be included, if desired, in the aqueous composition that includes the desired combination of inorganic phosphates, or, alternatively, the set gypsum-containing material can be treated with the polymer solution individually, separate from the inorganic phosphate treatment. If included in the aqueous composition including the inorganic phosphates, the polymer can be present in any suitable amount in the aqueous composition. For example, the polymer can be present in an amount of from about 0.1% to about 2% by weight of the composition.

In accordance with preferred embodiments of the invention, the inorganic phosphates are applied to the set gypsum-containing material, or, in the case of the trimetaphosphate salt, applied to the set gypsum-containing material and/or added during preparation of the set gypsum-containing material, in amounts sufficient to improve one or more of the strength, surface hardness, abrasion resistance, or water erosion resistance of the set gypsum-containing material (e.g., the resultant product). It will be appreciated that two or more of these characteristics, three or more of these characteristics, or even all four of these characteristics, as well as other characteristics of the set gypsum-containing material, can be improved in some embodiments of the invention as compared with the untreated set gypsum-containing material.

By way of illustration and not in any limitation, it has been found that some embodiments of the present invention exhibit a reduction in the water erosion of the set gypsum-containing material of at least about 25%. In some embodiments, the water erosion is reduced by at least about 35%, or at least about 45% (e.g., at least about 55%, 65%, 75%, or more), as compared with the untreated set gypsum-containing material. In the water erosion testing procedure, two set gypsum-containing material cubes (2 in.×2 in.×2 in.) exhibiting the same type of treatment or no treatment (control) are submerged into a fresh water bath (24 in.×48 in.×4 in.) for one week. During the entire one week of the water erosion test, the water bath has a constant flow of 0.5 gallons per minute of fresh tap water flowing into it from one end with water flowing out of the other end. The water erosion is then measured after one week by comparing the weight of the two cubes before and after submersion in the water bath. In some embodiments, the present invention provides a set gypsum-containing material that resists water erosion, as preferably characterized by exhibiting a weight loss of less than about 5%, more preferably, a weight loss of less than about 3%, after the one week submersion of the set gypsum-containing material in the fresh water bath.

With respect to enhancing abrasion resistance, it will be appreciated that, in some embodiments of the present invention, the abrasion resistance of the treated set-gypsum-containing material, as compared with the untreated set gypsum-containing material, is improved by at least about 95%. In some embodiments, the abrasion resistance is improved by at least about 96% or by at least about 97% (e.g., at least about 98%, at least about 99% or higher), as tested pursuant to ASTM D 4977-98b for a 30-cycle abrasion test at a 25 lb. load. In preferred embodiments, the treated set gypsum-containing material exhibits no weight loss, indicating no surface damage and hence no abrasion.

In some embodiments, the present invention enhances the flexural strength of the treated set gypsum-containing material, as compared with the untreated set gypsum-containing material, by at least about 5%. In preferred embodiments, the flexural strength is improved by at least about 10%, by at least about 12% (e.g., by at least about 14%) or more, as tested pursuant to ASTM C 473-95.

It will be appreciated that some embodiments of the present invention exhibit an improvement in the surface hardness of the treated set gypsum-containing material, as compared with the untreated set gypsum-containing material, of at least about 15% (e.g., by at least about 25%). In preferred embodiments, the surface hardness is improved by at least about 35% (e.g., at least about 45%), at least about 55% (e.g., at least about 65%), at least about 75% (e.g., at least about 85%), or even at least about 95% (e.g., at least about 105%, at least about 115%, or more), as tested on a Constant Diameter (C-D) Monotron device (manufactured by Shore Instrument and Manufacturing Company, New York, N.Y.). The Monotron surface hardness test will be appreciated readily by the ordinarily skilled artisan (see, e.g., Davis et al., *The Inspection of Engineering Materials*, Third Edition, pp.184–185, 200–203 (1964)).

The surface hardness measurements represent the load required to force a 10 mm steel ball to penetrate 0.01 in. into the surface of a gypsum cast, but if the penetration requires a load in excess of 180 kg (the capacity of the instrument), a 0.005 in penetration is used. The test specimens used in the test are tensile strength briquettes or 2 in. compressive strength cubes.

The following examples further illustrate the present invention but should not be construed as in any way limiting its scope. In the examples described below, the following abbreviations have the indicated meanings:

MAP=monoammonium phosphate;

NaTMP=sodium trimetaphosphate;

NaHMP=long chain sodium hexametaphosphate (CALGON, commercially available from Astaris, Inc., St. Louis, Mo.); and PVAC=polyvinyl acetate (obtained from Air Products).

EXAMPLES 1–8

These Examples illustrate the effect of the composition and methods of the present invention on the strength, hardness, water erosion resistance, and water adsorption of set gypsum-containing materials.

Two inch gypsum cubes were prepared at a 70 cc consistency (i.e., adding 100 gram plaster in 70 cc water) using No. 1 Molding Plaster (commercially available from United States Gypsum Company) according to typical and well known lab procedures. The cubes were dried in a 110° F. (≈43.3° C.) oven to reach a constant weight. For each test example, ten cubes were soaked in aqueous solutions containing various combinations of phosphates for one hour. The cubes were taken out of the chemical solutions and left under room conditions for one hour. The wet weight, wet compressive strength, and wet surface hardness were determined from half of the treated cubes (five cubes). The remaining treated cubes were re-dried at 110° F. (≈43.3° C.) in an oven to reach constant weight. The dry compressive strength, Monotron surface hardness, and water-erosion resistance were determined. In some evaluations, a pre-cast 4-inch diameter and 8-inch height (≈10.2 cm×20.3 cm) set gypsum cylinder was prepared to study the effects of surface treatment on the purging characteristics of the mold. The results are shown in Table I.

TABLE 1

| | Example No. | | | | | | | |
|---|---|---|---|---|---|---|---|---|
| | 1 | 2 | 3 | 4 | 5 | 6 | 7 | 8 |
| Aqueous Phosphate Composition (Post-Treatment Solution) | 4% MAP | Water | 4% MAP + 4% NaHMP | 4% MAP + 4% NaTMP | 4% NaTMP + 4% NaHMP | 4% NaHMP | 4% MAP + NaTMP + NaHMP | 4% NaTMP |
| Consistency of Test Cube Casting | 70 cc | 70 cc | 70 cc | 70 cc | 70 cc | 70 cc | 70 cc | 70 cc |
| pH | 4.7 | 7.0 | 5.05 | 4.91 | 5.6 | 5.7 | 4.97 | 6.4 |
| Dry Density Before Treatment | 69.0 lb/ft$^3$ | 69.0 lb/ft$^3$ | 69.1 lb/ft$^3$ | 69.0 lb/ft$^3$ | 69.0 lb/ft$^3$ | 68.9 lb/ft$^3$ | 69.8 lb/ft$^3$ | 69.6 lb/ft$^3$ |
| Dry Cube Weight Before Treatment | 145.0 g | 145.0 g | 145.2 g | 144.9 g | 144.9 g | 144.8 g | 146.7 g | 146.2 g |
| Wet Cube Weight After Treatment | 193.7 g | 192.8 g | 195.8 g | 194.6 g | 194.2 g | 193.1 g | 196.0 g | 195.1 g |
| Final Dry Cube Weight | 146.6 g | 144.8 g | 149.3 g | 148.6 g | 148.2 g | 146.3 g | 151.1 g | 148.3 g |
| 1 Hr. Compressive Strength | 1072 psi | 918 psi | 1185 psi | 1088 psi | 1121 psi | 1154 psi | 1283 psi | 1034 psi |
| Dry Compressive Strength | 2847 psi | 2287 psi | 2811 psi | 2737 psi | 2835 psi | 2729 psi | 2923 psi | 2734 psi |
| 1 Hr. Monotron Surface Hardness | 10.6 kg | 8.7 kg | 10.3 kg | 9.3 kg | 12 kg | 13.7 kg | 14.3 kg | 10.3 kg |
| Dry Monotron Surface Hardness | 32.7 kg | 26.3 kg | 37.3 kg | 32.0 kg | 38.7 kg | 32.7 kg | 52.0 kg | 28.7 kg |
| Interior Diamond plaster hardness | 17.5 | 13 | 27 | 18.5 | 28 | 18 | 21.5 | 22 |
| weight loss after 30 Cycle brushing test (%) | 0.37 | 3.53 | 0.54 | 1.05 | 0.49 | 0.90 | 0.55 | 1.48 |

Among the chemicals tested, good results were obtained with inorganic phosphates and/or their combination, as shown in Table 1. Post-set treatment of the gypsum test samples by this method increased Monotron surface hardness by 30–55 percent, compressive strength by 20–45 percent, and water-erosion resistance by 40–70 percent over control sample (treated with tap water only).

EXAMPLES 9–14

These Examples illustrate the improved abrasion resistance of set gypsum-containing materials made in accordance with the present invention.

For each example preparation of post-treatment, a 1 mm layer of DIAMOND® brand Interior Finish Plaster was trowel applied to a piece of 2.5"×9"×½" IMPERIAL® brand gypsum board (commercially available from United States Gypsum Company). After the plaster was set and air dried, the desired post-treatment solution was brush applied to the plaster surface. Immediately after post treatment, the wet weight of the gypsum board was recorded. The difference between the wet weight and the dry weight was used to determine total chemical dosage of post treatment after the sample was re-dried in the air again. A standard 30-cycle abrasion test was conducted on the re-dried sample according to ASTM D4977 test apparatus (DUROWELD, Lake Bluff, Ill.). For highly abrasion resistant coatings, 400–800 abrasion cycles were conducted. The weight loss and/or surface damage after abrasion test was determined and used as a criteria for abrasion resistance. The less the weight loss and surface damage, the greater abrasion resistance.

Table 2 lists the abrasion resistance and the surface hardness measurement of DIAMOND® Interior Finish Plaster, before and after application of post-treatment coatings. In Table 2, "solution" refers to aqueous solution containing various chemical compositions.

TABLE 2

| | Example No. | | | | | |
|---|---|---|---|---|---|---|
| | 9 | 10 | 11 | 12 | 13 | 14 |
| Chemicals or Additives | Tap water | PVAC | 2% NaHMP 1% MAP 1% NaTMP | 2% NaHMP 1% MAP 1% NaTMP + 1% PVAC | 2% NaHMP 2% MAP 2% NaTMP + 1% PVAC | 4% NaHMP 2% MAP 1% NaTMP + 1% PVAC |
| Total percentage of chemicals in post treatment solution | | 1% | 4% | 5% | 7% | 8% |
| Plastered Board size (sq in) | 23.12 | 23.12 | 23.12 | 23.12 | 23.12 | 23.12 |
| Initial dry board wt (g) | 156.90 | 157.70 | 157.70 | 151.68 | 148.89 | 155.06 |
| Wet board wt. after treatment (g) | 159.79 | 160.00 | 160.00 | 153.51 | 151.28 | 158.80 |
| Increased wet board wt. (g) | 2.89 | 2.30 | 2.30 | 1.83 | 2.39 | 3.74 |
| Total chemical dosage (g) | | 0.02 | 0.09 | 0.09 | 0.17 | 0.30 |
| Chemical Dosage per MSF (lb) | | 0.32 | 1.26 | 1.26 | 2.30 | 4.11 |
| Board Weight before Abrasive (g) | 156.84 | 161.77 | 161.77 | 151.78 | 148.73 | 155.31 |
| Weight after 30 cycle at 25 lb load (g) | 152.87 | 161.35 | 161.35 | 151.78 | 148.73 | 155.30 |
| Board Weight loss after 30 cycle (%) | 2.53 | 0.26 | 0.26 | 0.00 | 0.00 | 0.01 |
| Dry Monotron Surface Hardness (kg) | 16.00 | 23.00 | 23.00 | 20.00 | 15.00 | 18.50 |

It can be seen that after 30-cycle abrasion test, weight loss of treated board decreased significantly as compared to the control sample treated with tap water only. In the case of samples 12, 13, and 14, the abrasion test showed no weight loss after 30 cycle test. This indicated that post-treatment coatings significantly improved the abrasion resistance of DIAMOND® Interior Finish Plaster. For post-treated samples 12 and 13, no noticeable damage was observed even after 400-cycle abrasion. Test results confirmed that high abrasion-resistance can be achieved with a low chemical dosage of only 1–4 lb. per MSF, as shown in Table 2.

EXAMPLES 15–18

These Examples illustrate the effect of the present invention on water erosion and compressive strength of set gypsum-containing products.

Two inch gypsum cubes were prepared at a 70 cc consistency using No. 1 Molding plaster following the same sample preparation procedures as described in Example 1. For each test condition, four dried test cubes were soaked in a specified post-treatment solution for one hour. The treated cubes were taken out of the solutions and dried in a lab oven at 112° F. to reach a constant weight. The compressive strength of dried cubes was tested and averaged value was reported. In addition, the remaining test cube for each condition was then placed in a fresh water bath for one week of water erosion test. After the sample was taken out of the water bath, the cubes were re-dried and weighed. The weight loss before and after water erosion test was used to determine water erosion resistance. The results are shown in Table 3.

TABLE 3

| | Example No. | | | |
|---|---|---|---|---|
| | 15 | 16 | 17 | 18 |
| Additives in post treatment solution | Tap Water | 2% NaHMP 1% MAP 1% NaTMP + 1% PVAC | 2% NaHMP 1% MAP 1% NaMAP | PVAC 1% |
| Consistency | 70 cc | 70 cc | 70 cc | 70 cc |
| Dry Compressive Strength | 2579 psi | 2636 psi | 2926 psi | 2645 psi |
| % weight loss after 1 week submerged in water | 20.8 | 4.9 | 12.6 | 11.1 |

As seen in Table 3, the cube compressive strength was enhanced by post-treatment. Furthermore, as compared with the control sample (treated by tap water only), the water erosion resistance was also enhanced significantly by post-treatment, with the least amount of weight loss reflecting the least amount of water erosion. It is further evidenced from Example 16 that the combination of PVAC latex and inorganic phosphates provided the best water erosion resistance.

EXAMPLES 19–21

These Examples illustrate the effect of the present invention on the flexural strength of set gypsum-containing materials.

Three 3"×10"×½" samples of FIBEROCK® brand composite panel were dried in a lab oven. Each sample of FIBEROCK® panel was treated with specified post-treatment solution. The samples were dried again. The flexural strength was then tested for each of the samples. The two samples that were treated in accordance with the present invention, each exhibited increased flexural strength as compared to the control sample (Example 19) which was treated with water only. In Example 20, the treatment was achieved by brushing the post-treatment solution 3 times. In Example 21, the treatment was achieved by soaking in the solution for 15 seconds. The results are shown in Table 4.

TABLE 4

| | Example No. | | |
|---|---|---|---|
| | 19 | 20 | 21 |
| Additives in post-treatment solution | Control (water only) | 2% NaHMP 1% MAP 1% NaTMP + 1% PVAC | 2% NaHMP 1% MAP 1% NaTMP + 1% PVAC |
| Dosage (wt %) | 0.0 | 0.52 | 0.48 |
| Flexural Strength 3" × 10" FiberRock | 40.7 | 46.63 | 46.96 |
| Increase of Flexural Strength (%) | 0.0 | 14.6 | 15.4 |

All of the references cited herein, including patents, patent applications, and publications, are hereby incorporated in their entireties by reference.

While this invention has been described with an emphasis upon preferred embodiments, it will be apparent to those of ordinary skill in the art that variations of the preferred embodiments may be used and that it is intended that the invention may be practiced otherwise than as specifically described herein. Accordingly, this invention includes all modifications encompassed within the scope of the invention as defined by the following claims.

What is claimed is:

1. A method of treating a set gypsum-containing material comprising:
applying to said set gypsum-containing material at least one member from each of the following types of inorganic phosphate salts: monobasic phosphate salts, trimetaphosphate salts, and acyclic polyphosphate salts having at least three phosphate units.

2. The method of claim 1, wherein the inorganic phosphate salts are applied in amounts sufficient to impart the set gypsum-containing material with an improvement, as compared with the untreated set gypsum-containing material; in at least one characteristic selected from the group consisting of strength, surface hardness, abrasion resistance, water erosion resistance, and combinations thereof.

3. The method of claim 1, wherein the trimetaphosphate salt is selected from the group consisting of sodium trimetaphosphate, potassium trimetaphosphate, calcium trimetaphosphate, sodium calcium trimetaphosphate, ammonium trimetaphosphate, lithium trimetaphosphate, and combinations thereof.

4. The method of claim 1, wherein a composition is formed from the inorganic phosphate salts, which is then applied to the set gypsum-containing material.

5. The method of claim 4, wherein the composition comprises water.

6. The method of claim 5, wherein the composition is applied by way of spraying, dipping, spin coating, brushing, rolling, or combinations thereof.

7. The method of claim 4, wherein the composition is further formed from a polymer selected from the group consisting of a water dispersible polymer, a water soluble polymer, and combinations thereof 8. The method of claim 1, further comprising applying to the set gypsum-containing material a polymer selected from the group consisting of a water dispersible polymer, a water soluble polymer, and combinations thereof.

9. The method of claim 8, wherein the polymer is selected from the group consisting of acrylic latex, rubber latex, guar gum, sulfonated polystyrene latex, polyvinyl alcohol, polyvinyl acetate, and blends or combinations thereof.

10. The method of claim 1, wherein the monobasic phosphate salt is selected from the group consisting of monoammonium phosphate, monosodium phosphate, monolithium phosphate, monopotassium phosphate, and combinations thereof.

11. The method of claim 1, wherein the acyclic polyphosphate salt is soluble in water.

12. The method of claim 11, wherein the acyclic polyphosphate salt is selected from the group consisting of sodium hexametaphosphate having 6 to about 27 repeating phosphate units, potassium hexametaphosphate having 6 to about 27 repeating phosphate units, ammonium hexametaphosphate having 6 to about 27 repeating phosphate units, and combinations thereof.

13. The method of claim 1, wherein the monobasic phosphate salt is monoammonium phosphate, and the acyclic polyphosphate salt is sodium hexametaphosphate having 6 to about 27 repeating phosphate units.

14. The method of claim 1, wherein the set gypsum-containing material comprises one or more fillers.

15. The method of claim 14, wherein the filler is selected from the group consisting of silica sand, hydrated lime, and blends or combinations thereof.

\* \* \* \* \*